United States Patent
Ananthanarayanan et al.

(10) Patent No.: US 10,187,439 B2
(45) Date of Patent: Jan. 22, 2019

(54) DYNAMIC RECORDING OF ONLINE CONFERENCE

(71) Applicant: Microsoft Technology Licensing, LLC, Redmond, WA (US)

(72) Inventors: Krishnan Ananthanarayanan, Redmond, WA (US); Christopher M. Eagan, Seattle, WA (US); Amit Kumar Dutta, Sammamish, WA (US); Anand Srinivasan, Kirkland, WA (US); Mieszko Matkowski, Woodinville, WA (US)

(73) Assignee: Microsoft Technology Beaming, LLC, Redmond, WA (US)

( * ) Notice: Subject to any disclaimer, the term of this patent is extended or adjusted under 35 U.S.C. 154(b) by 201 days.

(21) Appl. No.: 15/130,220

(22) Filed: Apr. 15, 2016

(65) Prior Publication Data
US 2017/0302718 A1   Oct. 19, 2017

(51) Int. Cl.
| | |
|---|---|
| *G06F 15/16* | (2006.01) |
| *H04L 29/06* | (2006.01) |
| *H04L 29/08* | (2006.01) |
| *H04L 12/18* | (2006.01) |
| *H04N 7/15* | (2006.01) |

(52) U.S. Cl.
CPC ........ *H04L 65/604* (2013.01); *H04L 12/1831* (2013.01); *H04L 65/403* (2013.01); *H04L 67/02* (2013.01); *H04N 7/155* (2013.01)

(58) Field of Classification Search
CPC . H04L 12/1831; H04L 65/403; H04L 65/604; H04L 67/02; H04N 7/155

USPC .................................................. 709/203-248
See application file for complete search history.

(56) References Cited

U.S. PATENT DOCUMENTS

| | | | |
|---|---|---|---|
| 7,653,692 B2 | 1/2010 | Creamer et al. | |
| 8,643,694 B2 | 2/2014 | Xue | |
| 9,077,850 B1 * | 7/2015 | Groves | H04N 7/155 |
| 9,131,059 B2 * | 9/2015 | Jones | H04M 3/568 |
| 9,426,421 B2 * | 8/2016 | Balasaygun | H04N 7/15 |

(Continued)

OTHER PUBLICATIONS

"Call Recording Options", Retrieved on: Aug. 31, 2015, Available at: http://www.live-pa.com/Call-Recording.aspx.

(Continued)

*Primary Examiner* — Moustafa M Meky
*Assistant Examiner* — Thorne E Waugh
(74) *Attorney, Agent, or Firm* — Workman Nydegger

(57) ABSTRACT

An online conferencing system that provides fine-grained control over recording of the online conference. A participant manager component detects current participants in an online conference. A video gathering component gathers video streams for each of at least some of the current participants in the online conference. A triggering component allows one or more of the participants to trigger operation of a recording component. The recording component identifies one or more of the gather video streams to record, and records the identified one or more video streams. The recording component may have fine-grained control over the recording process. If a participant joins the conference, that video from the new participant may be automatically recorded also. If a participant leaves a conference, the recording of that video may be stopped.

24 Claims, 5 Drawing Sheets

(56) References Cited

U.S. PATENT DOCUMENTS

| | | | | |
|---|---|---|---|---|
| 2011/0261142 A1* | 10/2011 | Shanmukhadas | ........ | H04N 7/15 348/14.1 |
| 2013/0036168 A1* | 2/2013 | Upton | ................. | H04L 12/1827 709/204 |
| 2013/0198288 A1* | 8/2013 | Jones | ................. | H04L 12/1831 709/204 |
| 2014/0195675 A1* | 7/2014 | Silver | ................. | H04L 65/1083 709/224 |
| 2015/0026603 A1 | 1/2015 | Tripathi et al. | | |
| 2017/0064254 A1* | 3/2017 | Mueller | ................. | H04N 7/155 |

OTHER PUBLICATIONS

Bo, Max, "Skype Record Bot", Published on: Jun. 18, 2014, Available at: https://github.com/maximko/SkypeRecBot.

John, "Recording Plugin", Published on: Oct. 9, 2010, Available at: http://forum.teamspeak.com/showthread.php/58278-Recording-Plugin.

"Callnote Premium", Retrieved on: Aug. 31, 2015, Available at: http://www.kandasoft.com/home/kanda-apps/skype-call-recorder.html.

"Free Skype call recorderFree Skype Call Recorder", Published on: Oct. 6, 2012, Available at: http://voipcallrecording.com/skyperecorderhelp?page=1.

"Record your own conference calls with BT MeetMe Recording", Published on: Dec. 29, 2010, Available at: https://www.btconferencing.com/downloads-library/datasheets/en-us/bt-meetme-recording-datasheet.pdf.

"Verba Recording Blog", Published on: Mar. 7, 2014, Available at: http://blog.verba.com/recording-lync-conferences/.

"Love the Way It Looks", Published on: Mar. 2, 2014, Available at: http://www.clickmeeting.com/features/online-meeting-room.

"What is Pamela for Skype?", Published on: Mar. 9, 2015, Available at: http://www.pamela.biz/en/.

"Record and play back a Skype for Business (Lync) Meeting", Retrieved on: Aug. 31, 2015, Available at: https://support.office.com/en-nz/article/Record-and-play-back-a-Skype-for-Business-Lync-Meeting-811e7e25-3e7f-4998-8b93-5c60493307f1?ui=en-US&rs=en-NZ&ad=NZ.

"IBM Sametime", Published on: Nov. 21, 2013, Available at: http://www-03.ibm.com/software/products/en/ibmsame.

International Search Report and the Written Opinion issued in PCT Patent Application No. PCT/US2017/026736 dated Jun. 29, 2017.

* cited by examiner

DYNAMIC RECORDING OF ONLINE CONFERENCE

BACKGROUND

Computers and networks have ushered in new opportunities of social networking and collaboration. One form of such network is referred to as an "online conference". Early online conferencing took the form of video conferencing that required dedicated equipment, cameras, and so forth. More recently, online conferencing may be performed on almost any computing system. Applications are now offered by a variety of venders whereby a user can participate in an online conference by viewing video and audio of other participants, sharing collaborative work areas, chatting, and so forth, via a web site.

A typical online conferencing application provides a user interface that includes an online conferencing area, which includes a visualized representation of each participant. A contacts area of the user interface illustrates visualized representations of various individuals that might join into an online conference. Once in an online conference, individuals may communicate using video, audio, and other multi-media mechanisms. The communications that support the conferencing can take the form of Internet Protocol (IP) packets, and thus may be freely communicated over the Internet.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to an online conferencing system that provides fine-grained control over recording of the online conference. A participant manager component detects current participants in an online conference. A video gathering component gathers video streams for each of at least some of the current participants in the online conference. A triggering component allows one or more of the participants to trigger operation of a recording component. The recording component identifies one or more of the gathered video streams to record, and records the identified one or more video streams.

The recording component may have fine-grained control over the recording process. For instance, if a participant joins the conference, the video from the new participant may be automatically recorded also. If a participant leaves a conference, the recording of that video may be stopped. When multiple video streams are being recorded, a composite of the video may be recorded. The recording component might restrict a time scope in which a particular video stream is recorded, or may even alter the video (such as by adding augmented reality) of the recorded video. In some embodiments, the recording component may be one of numerous possible recording components that may be triggered, each recording in a different way, providing different default recording, and/or providing different options for varying from its default recording settings.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to an online conferencing system that provides fine-grained control over recording of the online conference. A participant manager component detects current participants in an online conference. A video gathering component gathers video streams for each of at least some of the current participants in the online conference. A triggering component allows one or more of the participants to trigger operation of a recording component. The recording component identifies one or more of the gathered video streams to record, and records the identified one or more video streams.

The recording component may have fine-grained control over the recording process. For instance, if a participant joins the conference, the video from the new participant may be automatically recorded also. If a participant leaves a conference, the recording of that video may be stopped. When multiple video streams are being recorded, a composite of the video may be recorded. The recording component might restrict a time scope in which a particular video stream is recorded, or may even alter the video (such as by adding augmented reality) of the recorded video. In some embodiments, the recording component may be one of numerous possible recording components that may be triggered, each recording in a different way, providing different default recording, and/or providing different options for varying from its default recording settings.

Some introductory discussion of a computing system will be described with respect to FIG. 1. Then, the system for recording online conference will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
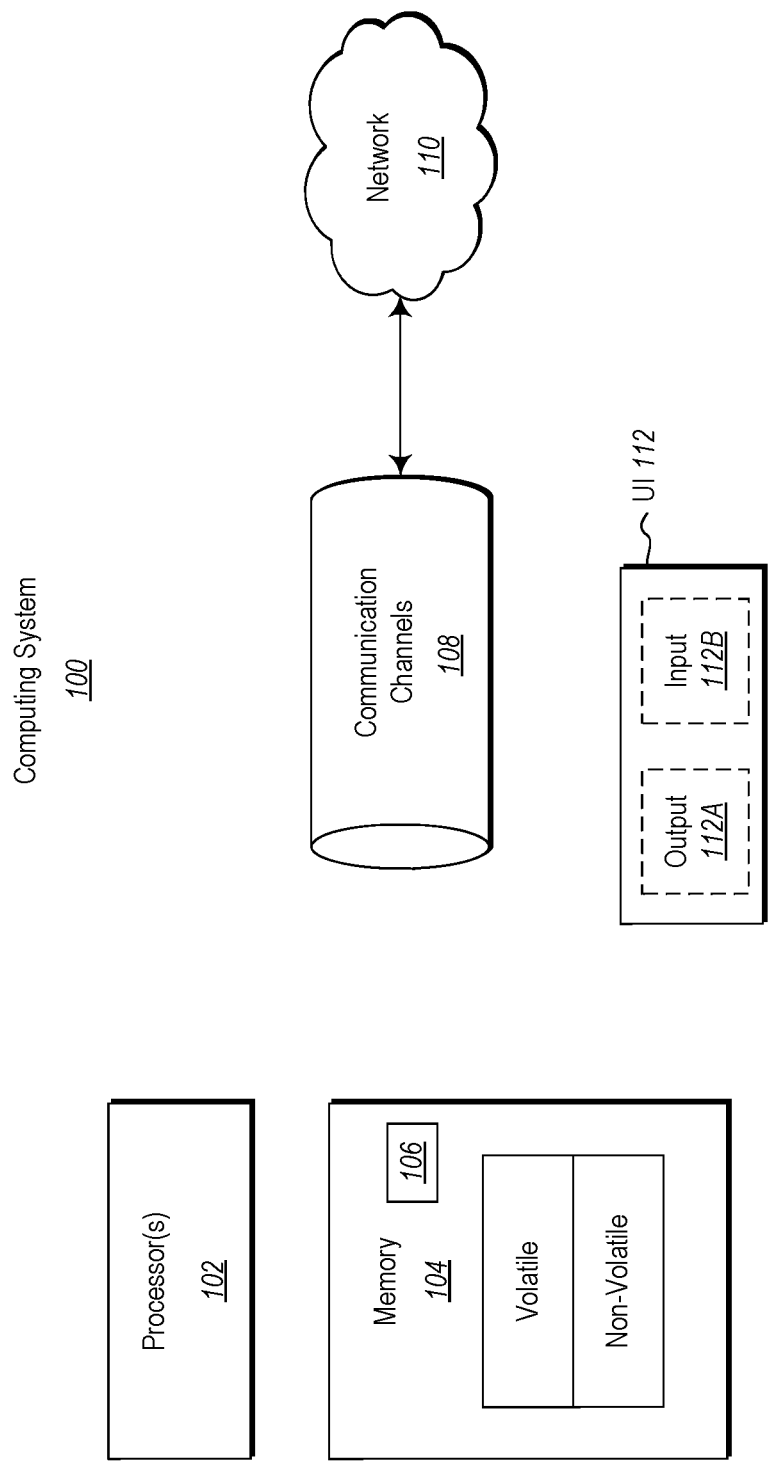
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
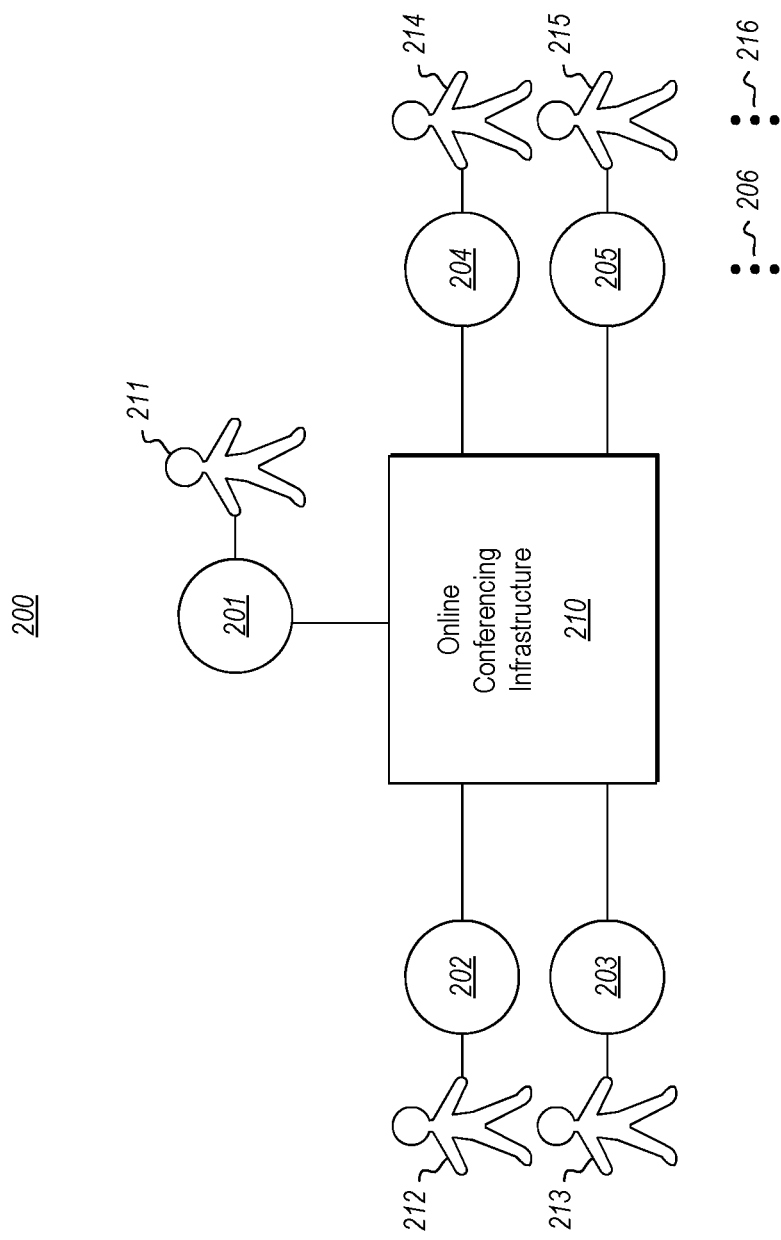
FIG. 2 illustrates an online conferencing environment in which the principles described herein may be employed, which includes multiple participants using corresponding participant computing systems to engage in the online conference using an online conferencing infrastructure.

FIG. 2 illustrates an online conferencing environment 200 in which the principles described herein may be employed. The online conferencing environment 200 includes multiple participant computing systems that participants use to engage in the online conference. The online conference environment 200 also potentially also include an online conferencing infrastructure 210. The online conferencing environment 200 may include dedicated computing systems that facilitate the online conference. For instance, the online conferencing environment 200 may be an online conferencing service that is implemented in a cloud computing environment or in some other remote network.

In the example of FIG. 2, there are five participant computing systems 201 through 205 involved in an online conference. However, the ellipses 206 represent that there may be any multiple number of participant computing systems engaged in any given online conference via the online conferencing infrastructure 210. In fact, one of the benefits of online conferencing is that any number of participants may participate, and participants may drop off and join at any time. The participant computing systems 201 through 205 may each be structured as described above for the computing system 100 of FIG. 1, and include user interface systems as described above for the user interface system 112 of FIG. 1. Each of the participant computing systems 201 through 205 have an associated participant user 211 through 215 respectively. The ellipses 216 again represents that there may be further participant users associated with yet other computing systems represented by the ellipses 206. Furthermore, there may be multiple users engaged with a single participant computing system.

Figure 3:
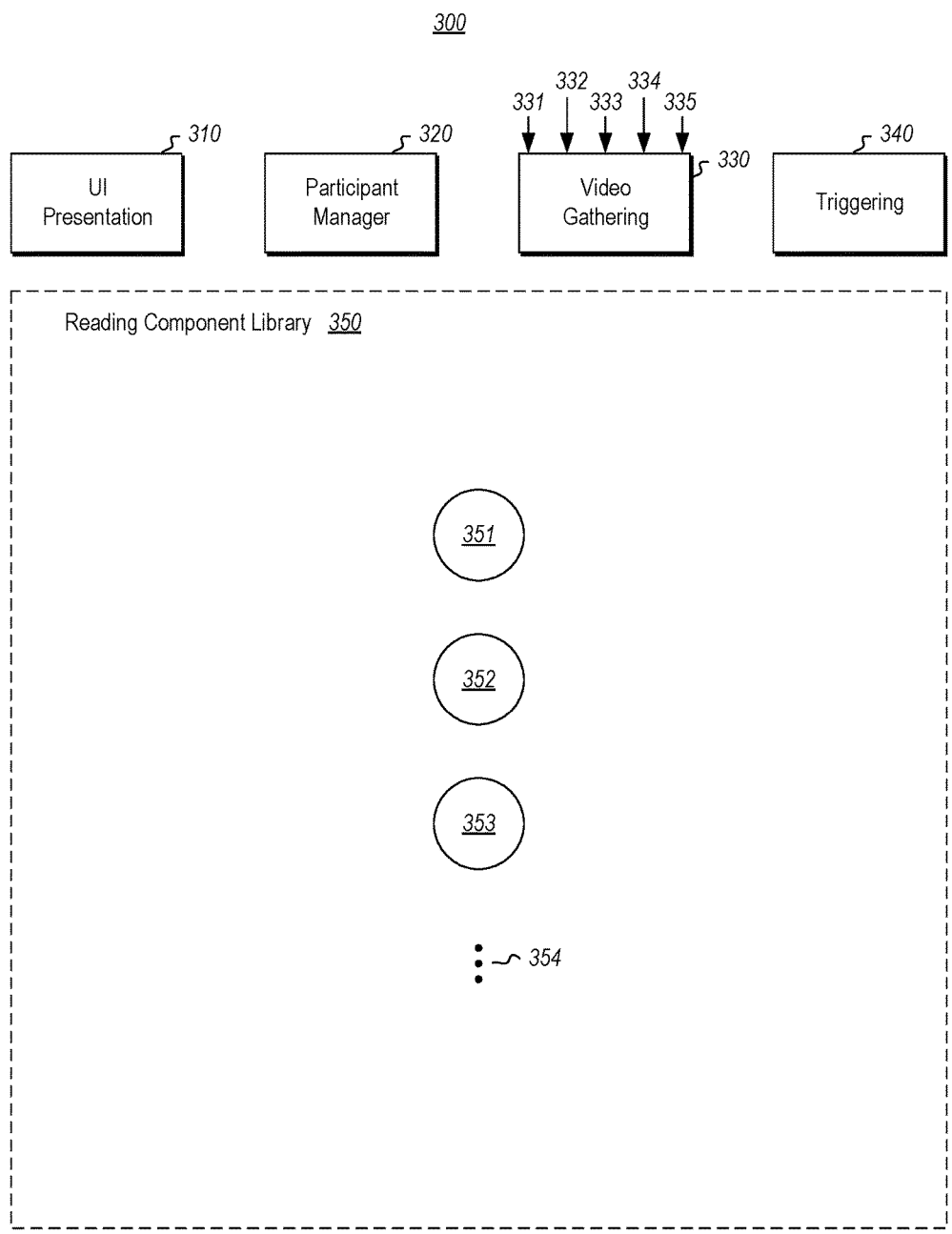
FIG. 3 schematically illustrates an online conferencing system that may operate within the online conferencing environment of FIG. 2, and which includes various executable components including a user interface presentation component, a participant manager component, a video gathering component, a triggering component, as well as a library of recording components that may be joined into an online conference.

FIG. 3 schematically illustrates an online conferencing system 300 that may operate within the online conferencing environment 200 of FIG. 2. The online conferencing system 300 includes various executable components including a user interface presentation component 310, a participant manager component 320, a video gathering component 330, and a triggering component 340. The system 300 also includes a library 350 of recording components that, when executed, record the online conference in some way. The library 350 of recording components are illustrated as including three executable components 351, 352 and 353, though the ellipses 354 represent that there may be any number of the recording components within the library. Each of the components 310, 320, 330, 340, 351, 352 and 353 may be structured as described above for the executable component 106 of FIG. 1.

The user interface presentation component 310 causes a user interface that represents the online conference to be presented on a display of each of the participant computing systems 201 through 205 for presentation to the corresponding participants 211 through 215. In some embodiments, the recording component is triggered to execute by joining a visualization of the recording component into an online conference very much like a participant would be joined into the online conference. For instance, a visualization of a recording component may be presented within a contacts list of the user interface along with other recording components and other potential participants in the online conference. If the user adds a participant to the online conference by dragging a copy of a contact into an online conference portion of the user interface, then recording may likewise be initiated by dragging a copy of the contact into the online conference portion of the user interface.

A participant manager component 320 detects current participants in the online conference. For instance, in the context of FIG. 2, the participant manager component 320 would be aware of that the participants 211 through 215 are in the online conference. The participant manager component 320 maintains the set of current participants such that if a new participant is added to the online conference, the participant manager component 320 is aware of the new participant; and such that if a participant drops from the online conference, the participant manager component 320 is aware that that participant is no longer in the online conference.

The video gathering component 330 gathers video streams for each of at least some of the current participants in the online conference. In the example of FIG. 3, the video gathering component 330 is illustrated as gathering five video streams 331 through 335. These video streams may correspond to, for instance, the video streams produced by the participant computing systems 201 through 205 in response to interaction with the participants 211 through 215, respectively.

The triggering component 340 allows one or more participants in the online conference to trigger operation of a recording component. As an example only, as previously mentioned, a recording component may be triggered to operate by dragging and dropping a visualization of the recording component from a contacts list into an online conference portion of a user interface.

The participant manager component 320, the video gathering component 330 and the triggering component 340 may be executed on the online conferencing infrastructure 210 or may be distributed between the online conferencing infrastructure 210 and a participating computing system. Likewise, the recording component library 350 may be present on the online conferencing infrastructure 210. If that online conferencing infrastructure is at a location where processing is plentiful, such as in a cloud computing environment or another location remote from the participants that is especially suited for processing, the recording components may have expanded processing capability and execute complex and perhaps fine-grained recording functionality.

Figure 4:
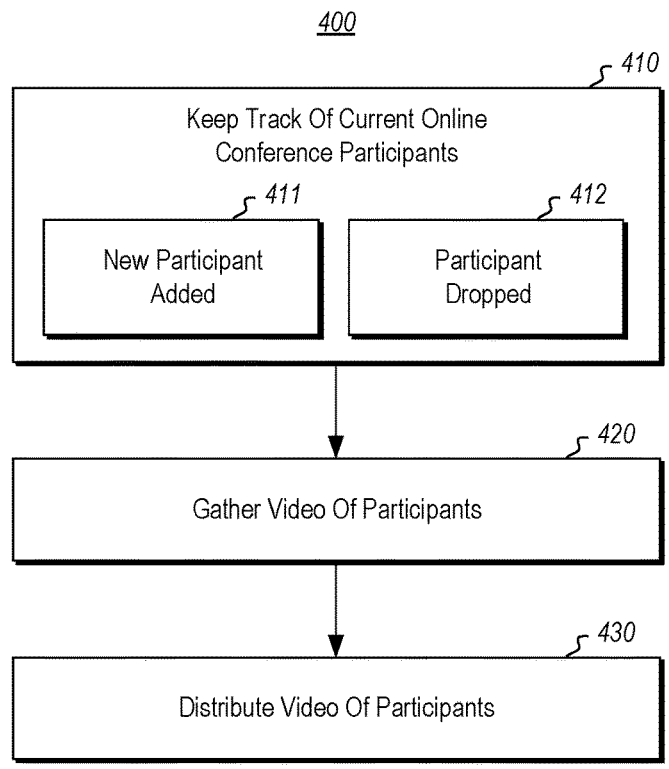
FIG. 4 illustrates a flowchart of a method for conducting an online conference.

FIG. 4 illustrates a flowchart of a method 400 for conducting an online conference. While keeping track of the current online conference participants (act 410), video streams are gathered associated with at least some of the participants in the conference (act 420), and at least some of those gathered video streams are distributed to other participants in the conference (act 430). The method may be performed by, for instance, the online conferencing infrastructure 210. Furthermore, it may be more than just the video that is gathered and distributed, but may include other forms of multimedia as well, such as audio, and chat.

As part of keeping track of the current online conference participants (act 410), there may at any point be new participants added to the online conference (act 411) or participants that are dropped from the online conference (act 412). This adding and dropping of participants is dynamically reflected in the current participant list, which could likewise result in a change in the identity of the video streams gathered (act 420), and where and to whom the video streams are distributed (act 430).

Figure 5:
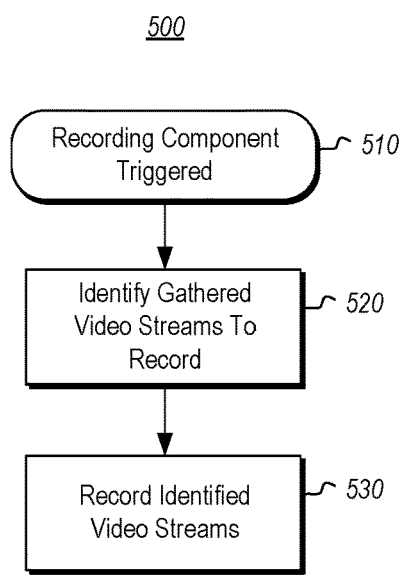
FIG. 5 illustrates a flowchart of a method for recording an online conference in accordance with embodiments described herein.
Figure 6:
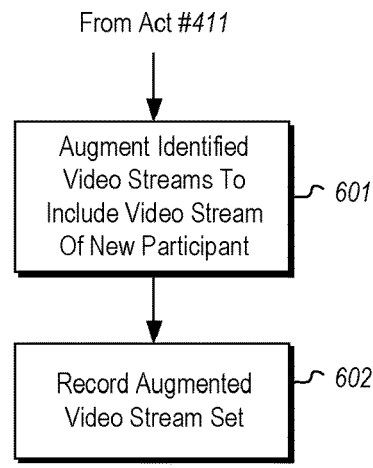
FIG. 6 illustrates a flowchart of a method for modifying a manner of recording in response to a new participant being added to the online conference.
Figure 7:
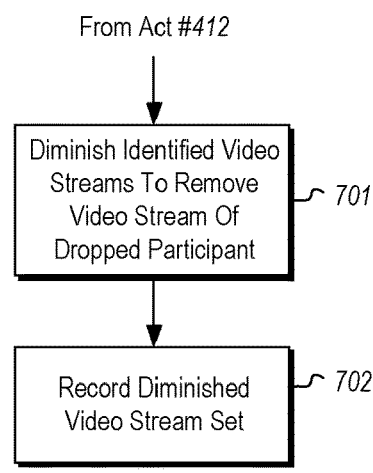
FIG. 7 illustrates a flowchart of a method for modifying a manner of recording in response to a participant being dropped from the online conference.

FIG. 5 illustrates a flowchart of a method 500 for recording an online conference. The method 500 may be performed by, for instance, the online conferencing infrastructure 210 when the online conferencing infrastructure is performing the method 400 of conducting the online conference.

The method 500 is initiated upon detecting that a recording component has been triggered (act 510). This detection may be performed by, for instance, the triggering component 340 of FIG. 3. For instance, the triggering component 340 may execute a recording component in response to use interaction with a user interface, such as perhaps the user dragging a visualization of the recording component from a contacts list into an online conferencing portion of a user interface.

The recording component then identifies one or more of the gather video streams to record (act 520), and then records the identified video streams (act 530). For instance, in FIG. 3, perhaps the recording component 351 is triggered into action. The recording component 351 may have a default setting to record certain ones of the video streams 331 through 335. For instance, perhaps that recording component 351 has a default setting to record all of the video streams 331 through 335 that are being gathered corresponding to the online conference. The recording component 351 might instead execute more complex analysis to determine which of the video streams to record. This is facilitated in the case of the recording component 351 being executed in a cloud computing environment or other remote area where processing is highly available.

As examples of complexity, the identification of the video streams may change as the current participants change. For instance, as a new participant is added while the recording component is executing, perhaps the recording component automatically starts recording the video from that new participant. Likewise, if a participant is dropped from the online conference, perhaps the recording component automatically stops recording the video from that participant. The identification of video streams may be based on any one or more factors including, but not limited to, the identity of the current participants, one or more actions taken by the current participants, the location of the current participants, the video quality of the video gathered for each participant, and/or so forth.

In order to record, there may be a notification to the other participants that the online conference (or a portion thereof) is being recorded. Alternatively or in addition, the consent of the other participants for recording may be sought and received for recording the online conference (or portion thereof). The online conferencing infrastructure 210 may be used to communication such notifications, requests for consent and/or consent.

The recording component may execute any complexity of analysis in order to determine what video streams to record, and how. One dimension of analysis might be what video streams to record. The recording component is not just limited to recording the video stream of the participant that triggered the recording, but may also include recording of the video streams for one or more or all of the other participants as well. In fact, the recording component need not be limited to embodiments in which the video is recorded at all of the participant that triggered the recording.

Furthermore, the recording component may change the video streams that are recorded dynamically. For instance, when a new participant joins the online conference (as detected in act 411), the recording component may respond by performing the method 600 of FIG. 6 by altering (act 601) the identified set of one or more video streams to record to include the video stream from the new participant, and then recording the augmented set of video streams (act 602). On the other hand, when a participant drops from the online conference (as detected in act 412), the recording component may respond by performing the method 700 of FIG. 7 by altering (act 701) the identified set of one or more video streams to record to remove the video stream of the dropped participant, and then recording the diminished set of video streams (act 702).

The recording component may also perform processing intensive tasks such as composing a composite video stream from the gathered video streams that are to be recorded, and recording instead (or in addition) the composite video stream. As circumstances change (e.g., the set of video streams changes, as the current active speaker changes, and/or as the number of participants within a particularly video stream change) then the composite video stream may likewise change by dynamically adjusting the boundaries between each video stream.

The recording component might also identify not just the video streams to record, but what time scope of the video stream to record. For instance, the time scope may not necessarily begin when a new participant joins an online conference, or when the recording of the online conference begins. Likewise, the time scope may end prior to the online conference ending, prior to the participant leaving, and prior to the end of the recording component operating to record the online conference. As an example, perhaps the recording is in speaker form in which only the video from the current speaker is recorded. Perhaps if multiple people are speaking simultaneously, the video streams from the simultaneous speakers are both recorded perhaps in composite form. Thus, as the dynamics of the conversation change, there could be dynamic changes in the recording in terms of what video is being recorded, and how the video streams are composed in the recording. In any case, the recording may, for any given video stream, be limited to less than all of the entire video stream for the online conference.

The recording component may perform other types of processing as well such as, pre-processing, to thereby actually alter the video stream prior to recording the video stream. For instance, the recording component may add augmented reality to the video stream. For instance, perhaps the head of the speaker may be enlarged somewhat or an arrow appears above the speaker to visually emphasize who is currently speaking. Facial recognition technology may also be employed to apply text over the video of a person identifying who the person is, or to detect micro-expressions that reveal emotions. Controls may also be provided so that individuals may be selected to find out more about the person, and so forth. Themes may be applied to the video. For instance, the video may be turned into a cartoon by quantizing color, smoothing edges, determining locations of focal features (eyes, noses, mouths) and replacing with cartoonish features, and so forth.

As described above, there is an almost infinite variety of ways that a recording component may record, either by default, or through further selection by a user that triggers the recording component. There may be different recording components that may be triggered to record in distinct ways by, for instance, recording by default in different ways, or having various ways to vary from the default settings. For instance, in FIG. 3, there are three recording components 351 through 353 shown. Each recording component may record in distinct ways. For instance, recording component 351 may simply gather all video provided in the online conference, and record as a composite video. Also as an example only, the recording component 352 may change recorded video streams quickly depending on who is speaking. Also as an example, the recording component 353 might apply augmented reality by placing a quote bubble above the speaker with the text of the words spoken placed within the quote bubble (e.g., for the hearing impaired).

Accordingly, the principles described herein provide an efficient mechanism to perform automated and recording on an online conference in a manner that a variety of recording choices are available, without being restricted by processing power. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An online conferencing system comprising:
   a participant manager that detects current participants in an online conference;
   a video gatherer that gathers video streams for each of at least some of the current participants in the online conference;
   a plurality of different recorders, each recorder comprising computer executable instructions configured to cause the recorder to perform an associated recording action within the online conferencing system when the recorder is triggered;
   a user interface listing that concurrently displays a single listing of individual visualizations including at least:
      a visualization for each of the plurality of different recorders; and
      a visualization for at least one current participant in the online conference;
   a trigger manager that allows one or more of the current participants in the online conference to trigger operation of a particular recorder by selecting a visualization corresponding to the particular recorder from the user interface listing; and
   the particular recorder that, when triggered, executes the associated recording action within the online conference, the associated recording action including at least:
      identifying one or more of the gathered video streams to record; and
      recording the identified one or more video streams, wherein the one or more identified video streams includes at least one video stream that is not of the participant that triggered operation of the particular recorder.

2. The online conferencing system in accordance with claim 1, the particular recorder altering the identification of the one or more video streams to record when a new participant joins the online conference, resulting in the particular recorder changing the set of one or more video streams that the particular recorder records.

3. The online conferencing system in accordance with claim 1, the particular recorder altering the identification of the one or more video streams to record when at least one current participant leaves the online conference, resulting in the particular recorder changing the set of one or more video streams that the particular recorder records.

4. The online conference system in accordance with claim 1, at least the video gatherer, and the particular recorder being executed in a cloud computing environment.

5. The online conference system in accordance with claim 1, at least the video gatherer, and the particular recorder being executed remotely from the current participants in the online conference.

6. The online conferencing system in accordance with claim 1, the particular recorder also identifying, for at least one of the identified video streams, a time scope of the video stream and limiting recording for that video stream to the time scope.

7. The online conferencing system in accordance with claim 1, the particular recorder further configured to alter at least one of the identified video streams so as to change the recorded video stream.

8. The online conferencing system in accordance with claim 1, the particular recorder further configured to apply augmented reality to at least one of the identified video stream such that the record video stream has augmented reality incorporated therein.

9. The online conference system in accordance with claim 1, the particular recorder identifying the set of one or more video streams to record based at least upon identity of the participants.

10. The online conference system in accordance with claim 1, the particular recorder identifying the set of one or more video streams to record based at least upon actions of the participants.

11. The online conference system in accordance with claim 1, the particular recorder identifying the set of one or more video streams to record based at least upon location of the participants.

12. The online conference system in accordance with claim 1, the particular recorder identifying the set of one or more video streams to record based at least upon quality of the video streams.

13. A method for recording at least a portion of an online conference, the method comprising:
   detecting current participants in an online conference;
   displaying a user interface listing that currently displays a single listing of individual visualizations, including at least:
      a visualization for each of the plurality of different recorders; and
      a visualization for at least one of the current participants of the online conference;
   gathering video streams for each of at least some of the current participants in the online conference;
   upon detecting that a particular current participant has triggered a particular recorder from the user interface listing, executing one or more computer executable instructions associated with the recorder that are configured to cause the recorder to perform an associated recording action within the online conference, wherein the associated recording action includes
   recording at least one video stream that is not of the particular current participant that triggered operation of the recorder.

14. The method in accordance with claim 13, further comprising:
   automatically notifying at least all of the recorded participants in the video conference that at least a portion of the online conference is being recorded.

15. The method in accordance with claim 13, further comprising:
   automatically requesting consent of at least all of the recorded participants in the video conference prior to the recording, wherein recording proceeds upon receiving consent.

16. The method in accordance with claim 13, the method further comprising the following:
   detecting that a new participant has joined the conference;
   altering the identified set of one or more video streams to record in response to detecting that a new participant has joined the conference; and
   recording the altered set of one or more video streams.

17. The method in accordance with claim 13, the method further comprising the following:
   detecting that a participant has left the conference;
   altering the identified set of one or more video streams to record in response to detecting that a participant has left the conference; and
   recording the altered set of one or more video streams.

18. The method in accordance with claim 13, the identified one or more video streams being a plurality of video streams, the recording comprising recording a composite of the plurality of video streams.

19. The method in accordance with claim 18, the recording comprising the following for at least one of the one or more identified video streams:
   limiting recording of the video stream to less than all of the entire video stream for that conference.

20. A computer program product comprising one or more computer-readable hardware storage media having thereon computer-executable instructions that are structured such that, when executed by one or more processors of the computing system, adapt the computing system to performing at least the following:
   detect current participants in an online conference;
   gather video streams for each of at least some of the current participants in the online conference;
   manage a plurality of different recorders, each recorder comprising computer executable instructions configured to cause the recorder to perform an associated recording action within the online conferencing system when the recorder is triggered;
   display a user interface listing that concurrently displays a single listing of individual visualizations, including at least:
      a visualization for each of the plurality of different recorders; and
      a visualization for at least one current participant of the online conference;
   upon detecting that a particular recorder has been triggered from the user interface listing, executing the associated recording action within the online conference, the associated recording action including at least
   recording at least one video stream that is not of the particular current participant that triggered operation of the particular recorder.

21. An online conferencing system comprising:
   a plurality of different recorders, each recorder comprising computer executable instructions configured to cause the recorder to perform an associated recording action within the online conferencing system when the recorder is triggered;
   a user interface element that concurrently displays, within a single listing, individual visualizations including at least a visualization for each of the plurality of different recorders; and
a visualization for at least one current participant of an online conference; and
a trigger manager that detects that a particular current participant has selected a particular recorder from the single listing, and as a result of the detecting the trigger manager triggers the associated recording action for the particular recorder to identify one or more video streams to record, and to record the identified one or more video streams,
wherein the particular recorder is further configured to alter the identification of the one or more video streams to record when a new participant joins the online conference, resulting in the particular recorder changing the set of one or more video streams that the particular recorder records.

22. An online conferencing system comprising:
a plurality of different recorders, each recorder comprising computer executable instructions configured to cause the recorder to perform an associated recording action within the online conferencing system when the recorder is triggered;
a video gatherer that gathers video streams for at least one of a plurality of current participants in an online conference;
a user interface element that concurrently displays, within a single listing, individual visualizations including at least
a visualization for each of the plurality of different recorders; and
a visualization for at least one current participant of an online conference; and
a trigger manager that detects that a particular current participant has selected a visual representation of a particular recorder from the single listing, and as a result of the detecting the trigger manager triggers the associated recording action for the particular recorder to identify one or more of the gathered video streams to record, and to record the identified one or more gathered video streams,
wherein the particular recorder is configured to alter the identification of the one or more gathered video streams to record when at least one of the plurality of current participants leaves the online conference, resulting in the particular recorder changing the set of one or more gathered video streams that the particular recorder records.

23. An online conferencing system comprising:
a participant manager that detects current participants in an online conference;
a plurality of different recorders, each recorder comprising computer executable instructions configured to cause the recorder to perform an associated recording action within the online conferencing system when the recorder is triggered;
a video gatherer that gathers video streams for at least one of a plurality of current participants in an online conference;
a user interface element that concurrently displays, within a single listing, individual visualizations including at least
a visualization for each of the plurality of different recorders; and
a visualization for at least one current participant of an online conference; and
a trigger manager that detects that a particular current participant has selected a visual representation of a particular recorder from the single listing, and as a result of the detecting the trigger manager triggers the associated recording action for the particular recorder to identify one or more of the gathered video streams to record, and to record the identified one or more gathered video streams,
wherein the particular recorder is further configured to identify, for at least one of the identified video streams, a time scope of the video stream, the particular recorder limiting recording for that video stream to the time scope.

24. An online conference system comprising:
a participant manager that detects current participants in an online conference;
a plurality of different recorders, each recorder comprising computer executable instructions configured to cause the recorder to perform an associated recording action within the online conferencing system when the recorder is triggered;
a video gatherer that gathers video streams for at least one of a plurality of current participants in an online conference;
a user interface element that concurrently displays, within a single listing, individual visualizations including at least
a visualization for each of the plurality of different recorders; and
a visualization for at least one current participant of an online conference; and
a trigger manager that detects that a particular current participant has selected a visual representation of a particular recorder from the single listing, and as a result of the detecting the trigger manager triggers the associated recording action for the particular recorder to identify one or more of the gathered video streams to record, and to record the identified one or more gathered video streams,
wherein the particular recorder is configured to alter the one or more video streams to record based at least upon quality of the video streams.

* * * * *

UNITED STATES PATENT AND TRADEMARK OFFICE
CERTIFICATE OF CORRECTION

PATENT NO. : 10,187,439 B2
APPLICATION NO. : 15/130220
DATED : January 22, 2019
INVENTOR(S) : Ananthanarayanan et al.

Page 1 of 1

It is certified that error appears in the above-identified patent and that said Letters Patent is hereby corrected as shown below:

In the Claims

<u>Column 11</u>
Line 47, Claim 13 change "each of the plurality" to –each of a plurality–

Signed and Sealed this
Twelfth Day of March, 2019

Andrei Iancu
*Director of the United States Patent and Trademark Office*